United States Patent
Rendahl et al.

(10) Patent No.: US 11,416,539 B2
(45) Date of Patent: Aug. 16, 2022

(54) MEDIA SELECTION BASED ON CONTENT TOPIC AND SENTIMENT

(71) Applicant: International Business Machines Corporation, Armonk, NY (US)

(72) Inventors: Randy A. Rendahl, Raleigh, NC (US); Jocelyn Sese, Knightdale, NC (US); Ashley Kristin Silva, Durham, NC (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 16/435,622

(22) Filed: Jun. 10, 2019

(65) Prior Publication Data

US 2020/0387534 A1 Dec. 10, 2020

(51) Int. Cl.
*G06F 16/00* (2019.01)
*G06F 16/48* (2019.01)
*G06N 3/08* (2006.01)
*G06F 16/45* (2019.01)
*G06F 16/438* (2019.01)

(52) U.S. Cl.
CPC ............ *G06F 16/48* (2019.01); *G06F 16/438* (2019.01); *G06F 16/45* (2019.01); *G06N 3/08* (2013.01)

(58) Field of Classification Search
CPC ........ G06F 16/48; G06F 16/45; G06F 16/438; G06N 3/08
USPC ........................................................ 707/734
See application file for complete search history.

(56) References Cited

U.S. PATENT DOCUMENTS

| | | | |
|---|---|---|---|
| 8,229,935 B2 | 7/2012 | Lee et al. | |
| 8,588,825 B2 | 11/2013 | Jonsson | |
| 9,857,946 B2 * | 1/2018 | Chowdhury | G06F 40/258 |
| 2005/0261032 A1 | 11/2005 | Seo et al. | |
| 2006/0098027 A1 | 5/2006 | Rice et al. | |
| 2008/0109391 A1 | 5/2008 | Chan | |
| 2008/0154883 A1 * | 6/2008 | Chowdhury | G06F 40/258 707/999.005 |
| 2010/0088605 A1 | 4/2010 | Livshin et al. | |

(Continued)

FOREIGN PATENT DOCUMENTS

CN 107357889 A 11/2017

OTHER PUBLICATIONS

Linn, "Happy? Sad? Angry? This Microsoft tool recognizes emotions in pictures", Microsoft, The AI Blog, Nov. 11, 2015, 5 pages. https://blogs.microsoft.com/ai/happy-sad-angry-this-microsoft-tool-recognizes-emotions-in-pictures/.

(Continued)

*Primary Examiner* — Jean M Corrielus
(74) *Attorney, Agent, or Firm* — Kelli D. Morin

(57) ABSTRACT

A content artifact is received. Based on the content artifact, a content topic is identified. Based on the content artifact, a content sentiment score associated with the content topic is generated. Based on the content topic, a set of media is identified. For each medium within the set of media, a medium sentiment score associated with the content topic is identified. The content sentiment score is compared to the set of media sentiment scores to obtain a set of similarity scores. Based on the similarity scores, one or more media from the set of media are displayed to a user.

20 Claims, 8 Drawing Sheets

(56) References Cited

U.S. PATENT DOCUMENTS

| | | | | |
|---|---|---|---|---|
| 2013/0311485 | A1* | 11/2013 | Khan | G06F 16/335 |
| | | | | 707/758 |
| 2015/0127748 | A1 | 5/2015 | Buryak | |
| 2015/0193889 | A1* | 7/2015 | Garg | G06Q 30/0251 |
| | | | | 705/14.49 |
| 2015/0331563 | A1* | 11/2015 | Chowdhury | G06F 40/258 |
| | | | | 715/765 |
| 2015/0356571 | A1* | 12/2015 | Chang | H04L 51/32 |
| | | | | 705/7.29 |
| 2018/0232362 | A1* | 8/2018 | Khan | G06F 16/353 |
| 2019/0050875 | A1* | 2/2019 | McCord | G06F 40/30 |
| 2019/0332694 | A1* | 10/2019 | Tcherechansky | G06F 16/634 |
| 2020/0026772 | A1* | 1/2020 | Wheeler | G06F 16/9535 |
| 2020/0159829 | A1* | 5/2020 | Zhao | G06F 40/30 |
| 2020/0387534 | A1* | 12/2020 | Rendahl | G06N 3/0454 |

OTHER PUBLICATIONS

"Tone Analyzer", IBM, Watson, printed Apr. 24, 2019, 6 pages. https://www.ibm.com/watson/services/tone-analyzer/.

"Speech to Text", IBM, Watson, printed Apr. 24, 2019, 6 pages. https://www.ibm.com/watson/services/speech-to-text/.

Mell et al., "The NIST Definition of Cloud Computing", Recommendations of the National Institute of Standards and Technology, Sep. 2011, U.S. Department of Commerce, 7 pages.

* cited by examiner

MEDIA SELECTION BASED ON CONTENT TOPIC AND SENTIMENT

BACKGROUND

The present disclosure relates generally to the field of media selection, and more particularly to selecting media according to the topic and sentiment of content.

Devices that display media may display a single image, a slideshow of images, emojis, videos, music, etc. Traditional devices are typically limited to displaying a particular collection of media; for example, images in a particular file folder on a computing device may be displayed in a slide show format.

SUMMARY

Embodiments of the present disclosure include a method, computer program product, and system for media selection according to the topic and sentiment of content.

A content artifact is received. Based on the content artifact, a content topic is identified. Based on the content artifact, a content sentiment score associated with the content topic is generated. Based on the content topic, a set of media is identified. For each medium within the set of media, a medium sentiment score associated with the content topic is identified. The content sentiment score is compared to the set of media sentiment scores to obtain a set of similarity scores. Based on the similarity scores, one or more media from the set of media are displayed to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1A:
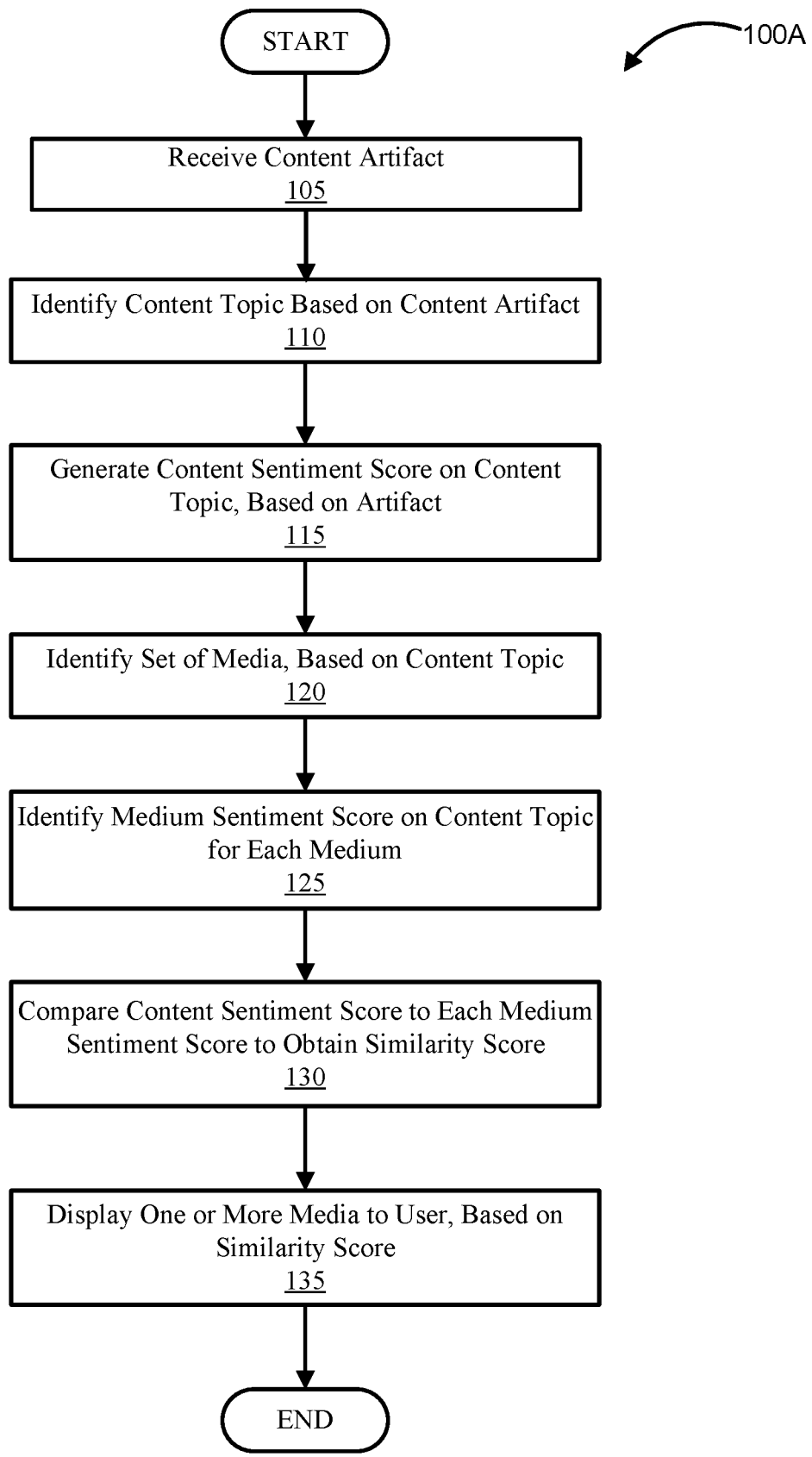
FIG. 1A illustrates a flowchart of a method for media selection according to the topic and sentiment of content, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of media selection, and more particularly to selecting media according to the topic and sentiment of content. While the present disclosure is not necessarily limited to such applications, various aspects of the disclosure may be appreciated through a discussion of various examples using this context.

Embodiments of the present disclosure are directed to selecting appropriate media (e.g., images, video, music, emojis, etc.) based on an analysis of related content artifacts (e.g., an article, a voice recording or streaming audio, an instant messaging conversation, a text message conversation, etc.). It may be less appropriate to show an image that does not match the particular tone, or sentiment, of the content artifact. Traditional methods for selecting such media often rely on random selection from, for example, public records or a social media site, which can lead to a less optimal medium being selected. For example, an image of a subject/topic that is decades old, or one depicting the subject expressing an emotion or participating in an activity that does not match the tone/sentiment of the content artifact.

Other conventional methods may also provide drawbacks. For example, employing user-designation of the mood/tone/sentiment of media is error-prone, due to forgetfulness, the mood of the user at the time of designation, "cockpit" error (e.g., erroneously assigning an incorrect tone or other manual error), etc. Bio-feedback based methods (e.g., using facial recognition or voiceprint techniques to asses user reactions/emotions) may also provide erroneous feedback, due to unintended/unrelated reactions (e.g., reacting to a coffee spill, being interrupted by another person off-camera, moving outside of frame/range, electrical interference, etc.).

Embodiments of the present disclosure provide a more robust way to select media that appropriately matches both the topic and sentiment of a particular content artifact. Embodiments may analyze a content artifact to determine the sentiment and topic of the content, search for (if no repository of media is already present) media matching the topic, then present a subset of the media to the user, where the subset of media has been analyzed and screened for appropriate sentiment.

In embodiments, sentiment scores may be generated to assess the sentiment of a content artifact or medium/set of media, based on the topic of the content artifact. For example, a single photo may portray multiple people, but not all people may be expressing the same emotion in the photo. Therefore, depending on which person is considered "the topic," the tone/sentiment of the photo may drastically shift. Once the sentiment of the content artifact and the set of media have been determined, distance metrics (e.g., Earth-Mover, Mahalanobis, Euclidian, etc.) or other techniques may be employed to determine which medium (or subset of media) from the set of media is/are most appropriate for the content artifact. This may be performed using comparisons of sentiment scores by topic (e.g., does content artifact A's sentiment score for topic B meet a comparison threshold?). In embodiments, using an aggregation of sentiment scores for multiple topics to determine an overall sentiment score (or a multi-dimensional sentiment score) may be used for the content artifact and set of media.

In embodiments, the subject, or topic, of an image or other media may be the author of a particular article, audio clip, messaging conversation, etc. For example, the author of a particular content artifact may wish to share a recent photo taken during a recent trip. If the sentiment of a hypothetical instant messaging conversation is positive (e.g., the author had a good time), it may be desirable to have a subset of all the photos taken (e.g., photos with positive sentiment) during that trip displayed automatically.

Embodiments of the present disclosure may ensure that the subset of photos all match the positive sentiment of the instant messaging conversation. Likewise, if the sentiment of the conversation is negative (e.g., the author had a terrible time), then the subset of photos may be automatically selected to match the negative sentiment. In embodiments, if the automatically-assessed sentiment of a selected photo is less than optimal (e.g., if the user overrides and selects a photo outside the subset, or if the user selects a photo that does not match the sentiment as well as other photos in the subset), the assessment techniques used to assess the sentiment of the photos may be automatically adjusted to more closely conform with the user's selection.

Turning now to the figures, FIG. 1A illustrates a flowchart of a method 100A for media selection according to the topic and sentiment of content, in accordance with embodiments of the present disclosure. Method 100A may begin at 105, where a content artifact is received. As discussed herein, a content artifact may be an article, a video, a slideshow, presentation, conversation transcript (e.g., text message thread, forum thread, instant messaging conversation, etc.), audio presentation, webcast, etc.

At 110, a content topic is identified, based on the content artifact. The content topic may be the main subject of the content artifact. Techniques for identifying the content topic may include user selection, but they may additionally include automated techniques, such as natural language processing (NLP) (e.g., in the case of textual documents or transcripts of audio recordings), image recognition analysis (e.g., to identify objects in an image/video), facial recognition (e.g., to identify individuals within an image/video), location determination (e.g., identifying a location where an image was generated, or determining a location based on textual/audio descriptions), etc. In embodiments, neural networks may be employed to identify the content topic (e.g., cognitive image analysis, cognitive facial recognition, etc.).

At 115, a content sentiment score for the content topic is generated from the content artifact. In embodiments, a content sentiment score may be generated using cognitive techniques from IBM WATSON®. For example, an article may be analyzed to determine whether the author's sentiment of the topic is positive, negative, pleased, disgusted, fanciful, whimsical, apathetic, ambivalent, etc. In embodiments, a sentiment score may be based on a continuum (e.g., from "bad" to "good"), or it may be multidimensional (e.g., a point plotted within one or more 3D models where the axes define a given analyzed component of the sentiment score).

At 120, a set of media is identified, based on the content topic. In embodiments, a media repository may be predefined (e.g., a particular file folder on a computing device), or it may be undefined (e.g., the set of media may be fetched from the Internet, by searching an entire disk drive within the computing device, by scanning multiple shared folders over multiple devices, by searching relevant social media accounts, etc.). In embodiments where the content artifact is being generated in real time (e.g., a live news broadcast, a videoconference conversation, etc.), the media may be searched for in real time (e.g., in tandem with) the generation of the content artifact.

Once the set of media is identified, a medium sentiment score for the content topic is identified for each medium within the set at 125. In embodiments, a similar (or possibly the same) sentiment analysis that was performed on the content artifact to achieve a content sentiment score may be performed on each medium to provide each medium with a medium sentiment score for the content topic. For example, image sentiment analysis may be performed on a set of images to determine what sentiment each image conveys. In embodiments, the results of the sentiment analysis may be appended to the media via metadata tags, thereby speeding up subsequent searches. In embodiments, neural networks may further be employed in the generation of cognitive sentiment scores.

In embodiments, the set of media may have metadata tags that already describe the sentiment scores (e.g., they may have been analyzed previously). In such cases, the metadata tags with appropriate sentiments may be identified and returned by the search.

At 130, the content sentiment score may be compared with each medium sentiment score to obtain a similarity score. As described herein, distance metrics may be employed to determine the similarity scores.

At 135, one or more of the media may be displayed to the user, based on the similarity score. For example, the "most similar" medium may be returned to the user, or a subset of media (e.g., the five most similar media) may be presented to the user.

Figure 1B:
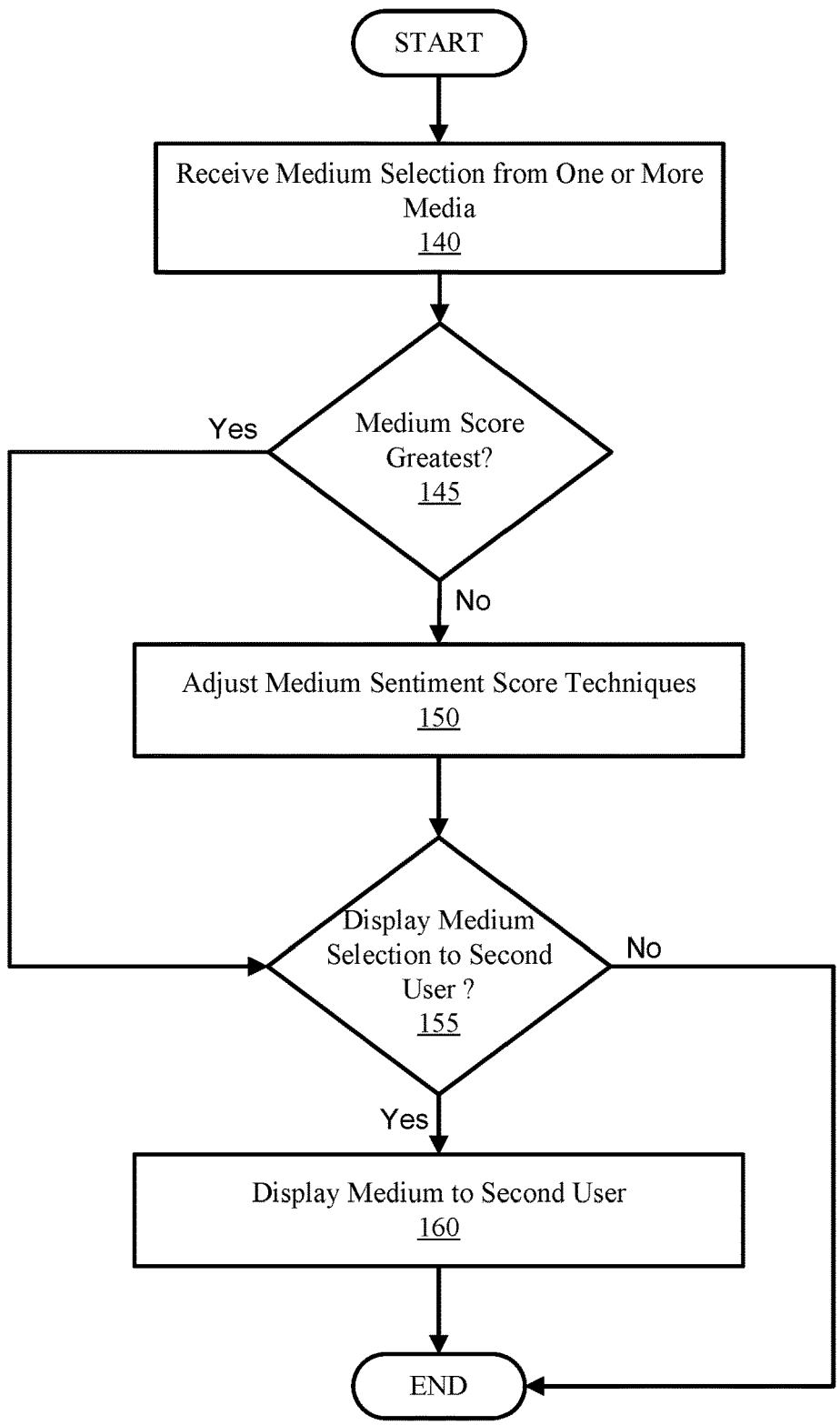
FIG. 1B illustrates a flowchart of a method for adjusting medium sentiment scores, in accordance with embodiments of the present disclosure.

Referring now to FIG. 1B, illustrated is a flowchart of a method 100B for adjusting medium sentiment scores, in accordance with embodiments of the present disclosure. In embodiments where neural networking is employed to generate sentiment scores, a user may be presented with one or more media, as described in 135 of FIG. 1, and subsequent thereto, a medium selection from among the one or more media may be received at 140.

At 145, it is determined whether the selected medium's sentiment score is the greatest among the medium sentiment scores. In other words, the selected medium's medium sentiment score is compared to the remaining medium sentiment scores to determine whether the techniques described herein were successful in predicting which medium was the most appropriate. If the prediction was correct (e.g., "Yes"), the method proceeds to 155. If the method was incorrect (e.g., "No"), the method proceeds to 150, where the techniques used to make the prediction are adjusted to force the selected medium's medium sentiment score to become the greatest of all the medium sentiment scores. This may be achieved, for example, by adjusting the weights and biases for one or more edges of the neural network that produced the prediction. Neural networking techniques are described in greater detail with reference to FIG. 4.

At 155, it is determined whether the selected medium should be displayed to a second user. For example, as described herein, the user may be in communication with a second user (e.g., via e-mail, instant messaging, text messaging, during a live video stream, etc.). If it is confirmed that the selected medium should be displayed to the second user (e.g., "Yes"), then the medium is displayed to the second user at 160. If the confirmation is not achieved (e.g., "No"), then the method ends.

Figure 2:
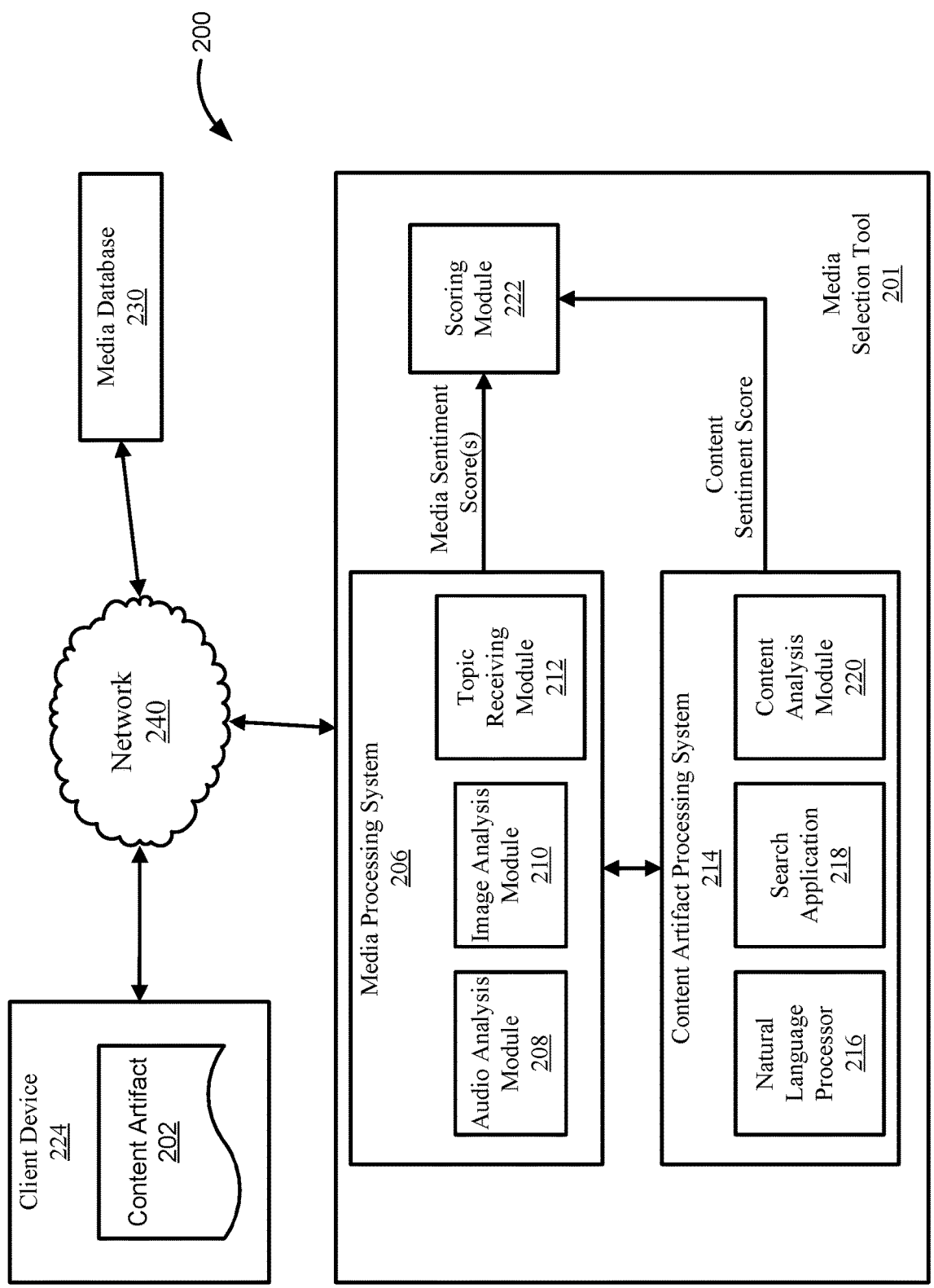
FIG. 2 illustrates an example networking environment, in accordance with embodiments of the present disclosure.

Turning now to FIG. 2, illustrated is an example networking environment 200, in accordance with embodiments of the present disclosure. Networking environment 200 may include a client device 224, media database 230, network 240, and a media selection tool 201 (e.g., a system) for media selection based on content topic and sentiment. Media selection tool 201 may be implemented as an application running on a user's computing device, as a service offered via the cloud, as a web browser plugin, as a smartphone application, or as a codependent application attached to a secondary application (e.g., as an "overlay" or a companion application to a partner application, such as a text messaging application).

Network 240 may be any type or combination of networks. For example, network 240 may include any combination of personal area network (PAN), local area network (LAN), metropolitan area network (MAN), wide area network (WAN), wireless local area network (WLAN), storage area network (SAN), enterprise private network (EPN), or virtual private network (VPN). In some embodiments, the network 240 may refer to an IP network, a conventional coaxial-based network, etc. For example, a server storing media database 230 may communicate with various client devices (e.g. tablets, laptops, smartphones, portable terminals, client device 224, etc.) over the Internet.

In some embodiments, the network 240 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 240. Cloud computing is discussed in greater detail in regard to FIGS. 5 & 6.

Client device 224 may be a desktop, laptop, smartphone, tablet, or any other suitable computing device for a user to interact with and execute the methods/techniques described herein. In embodiments, client device 224 may store one or more content artifacts, such as content artifact 202. As described herein, content artifact 202 may be a written article, an audio stream, a video stream, etc.

Media database 230 may store a wide variety of media, as contemplated herein. For example, media may include still images, videos, music, audio recordings, or any other type of media an author/user of content artifact 202 may wish to add or use in conjunction with content artifact 202. In embodiments, media database 230 may reside on a single server, on multiple servers within a cloud computing environment, and/or on the client device 224 or on the same physical system or virtualized system as media selection tool 201.

Media selection tool 201 may be a standalone computing system, such as a desktop or laptop; a server; or a virtualized system running on one or more servers within a cloud computing environment. Media selection tool 201 may include media processing system 206, content artifact processing system 214, and scoring module 222.

In embodiments, content artifact 202 may be received at by the media selection tool 201 via the network 240. The content artifact processing system 214 may include, e.g., a natural language processor 216, a search application 218, and a content analysis module 220.

In embodiments, the natural language processor 216 may be configured to analyze textual transcripts identify one or more content topics. In embodiments, natural language processor 216 may further be configured to receive audio inputs and convert them into structured text, from which content topics may then be identified. Greater detail on NLP techniques is discussed in regard to FIG. 3.

As content topics are identified, content sentiment scores may be generated to determine the sentiment, or tone, of the content artifact with regard to the identified content topic via content analysis module 220. In embodiments, content analysis module 220 may include, or store information in, a relational database, triplestore, or text index for identifying terms and phrases associated with topics, in order to generate a content sentiment score. In other embodiments, content analysis module 220 may include a convolutional neural network to generate a content sentiment score. In yet other embodiments, the content analysis module 220 may include, for example, both a relational database and a convolutional neural network, and may use the data from the relational database as input for the convolutional neural network. Sentiment scores may be output to scoring module 222 for similarity scoring.

Search application 218 may be employed to find a set of media by searching media database 230 for the content topic identified by natural language processor 216. As described herein, media database 230 may include a pre-defined file folder or computer, or it may be construed as a collection of websites, computers, servers, etc. Search results may be returned to the media processing system 206.

In some embodiments, the media processing system 206 may include, e.g., an audio analysis module 208, an image analysis module 210, and a topic receiving module 212. The topic receiving module 212 may be configured to receive, from the content artifact processing system 214, content topics identified by analyzing one or more content artifacts 202 that are necessarily related to the set of media retrieved by search application 218.

For example, in embodiments, audio recognition may be employed, as part of natural language processing system 214, to identify a term or phrase in the audio input. A superclass for the term or phrase may be determined by parsing a relational database for the term/phrase, and the superclass may be assigned as a content topic. After identifying content topics, the natural language processing system 214 may transmit data regarding the content topic(s) to the topic receiving module 212, as the textual attributes may inform the identification of visual/audio attributes by the image analysis module 210, or audio analysis module 208, respectively.

Based on digital file formats (e.g., image file formats (e.g., .jpg), textual formats (e.g., .docx, .raf, .txt, etc.), music formats (e.g., .wav, .mp4, .mp3, etc.), and video file formats (e.g., .wmv)), media processing system 206 may determine with which processing module (e.g., audio analysis module 208 or image analysis module 210) the system should use to analyze the media received in response to the search application 218's results. In embodiments where textual media is received, analysis of the textual media may be performed at, for example, natural language processor 216. In other embodiments, media processing system 206 may include its own natural language processor (not shown).

In embodiments, audio analysis module 208 may be configured to receive audio formats and process the audio file to identify a medium sentiment score using the techniques described herein (e.g., where the medium sentiment score is already included in the metadata for the audio file). In other embodiments, the medium sentiment score for the audio file may be generated using the sentiment analysis techniques described herein (e.g., using a neural network, using IBM WATSON®, etc.). Audio files may include music, audio recordings of interviews, webcasts, streaming audio, etc. Medium sentiment scores from audio analysis module 208 are sent to scoring module 222. Audio files that have been processed may be annotated with the sentiment score and related information as metadata, and stored in media database 230.

In embodiments, image analysis module 210 may be configured to receive video and image formats to identify objects, locations, people, etc. (e.g., subjects) within images and output sentiment scores, as described herein. In embodiments where a video file is received, still frame images may be selected at random intervals, at regular intervals, or a "best image" may be selected according to still image selection criteria. In other embodiments, a separate video analysis module (not shown) may be included for generating medium sentiment scores for video files.

In embodiments, image analysis module 210 may be configured to identify (e.g., from a still image, a video, or a single frame of a video feed), an object or topic (e.g., people, pets, automobiles, buildings, etc.). Image analysis module 210 may further identify, given the combination of objects in the image, the context of the image. For example, an image with a combination of objects including one or more people, a snowy mountain, and a set of skis may provide the basis for identifying the context of the image as a ski trip. Image analysis module 210 may perform the sentiment analysis techniques described herein to output a medium sentiment score for an analyzed image, based on the received content topic.

Once the objects, attributes, context, and sentiment score of an image have been identified, the image may be "tagged" or otherwise annotated with a list or table reflecting this information (e.g., as metadata) and stored in media database 230. Sentiment scores generated by image analysis module 210 are sent to scoring module 222.

In embodiments, as discussed herein, scoring module 222 may be used to generate similarity scores based on the received sentiment scores for both the content and the media, as discussed herein.

In embodiments, scoring module 222 may employ a neural network to generate similarity scores, as described herein. In embodiments, a neural network may be a multi-layer perceptron, a system of sigmoid neurons, a directed acyclic graph comprising a plurality of corelets, or any other structure/system capable of neural networking.

Scoring module 222 may select, based on the similarity scores, one or more media to display to the user, as described herein. The parameters for the selection may include the single medium with the greatest similarity score, or it may be a subset of media (e.g., the ten media with the greatest similarity scores). Selection parameters may be adjustable.

Figure 3:
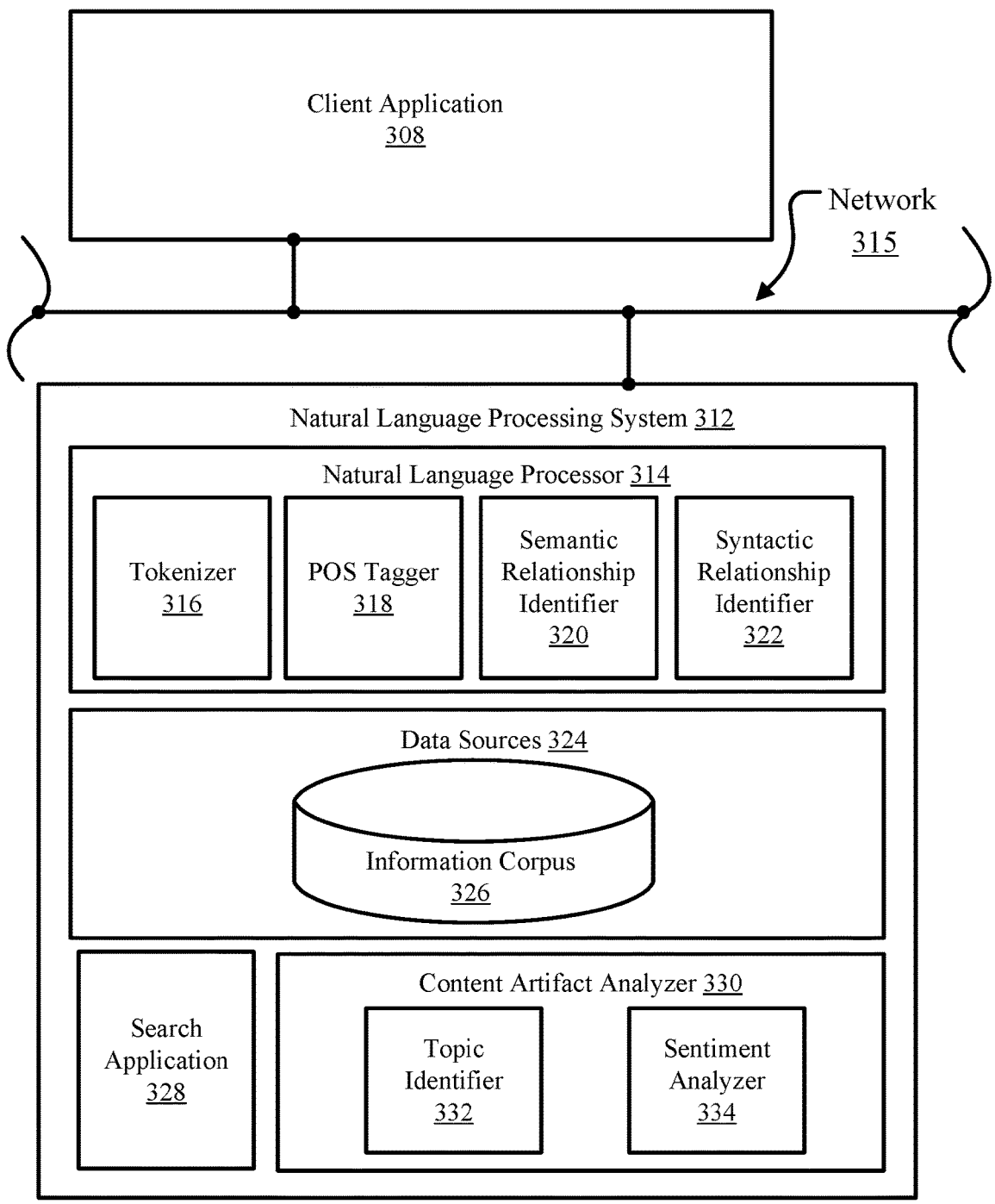
FIG. 3 illustrates a block diagram of an example natural language system configured to analyze content artifacts, in accordance with embodiments of the present disclosure.

Turning now to FIG. 3, illustrated is a block diagram of an example natural language system 300 configured to analyze content artifacts and/or textual/audio media, in accordance with embodiments of the present disclosure. In some embodiments, a media selection tool (such as the media selection tool 120 of FIG. 1) may receive raw textual/audio data (e.g., a content artifact or a textual/audio medium) and send them in the form of unstructured textual documents/transcripts (e.g., "electronic documents") to be analyzed by the natural language system 300 which may be a standalone device, or part of a larger computer system. Such a natural language system 300 may include a client application 308, which may itself involve one or more entities operable to generate or modify information in the unstructured textual document(s) (e.g., analog or electronic textual content artifacts) that is then dispatched to a natural language processing system 312 via a network 315.

Consistent with various embodiments, the natural language processing system 312 may respond to electronic document submissions sent by a client application 308. Specifically, the natural language processing system 312 may analyze a received an unstructured textual document (e.g., a content artifact) to identify one or more terms associated with the content topic. In some embodiments, the natural language processing system 312 may include a natural language processor 314, data sources 324, a search application 328, and a content artifact analyzer 330. The natural language processor 314 may be a computer module that analyzes the received unstructured textual conversation transcript(s) and other electronic documents. The natural language processor 314 may perform various methods and techniques for analyzing electronic documents (e.g., syntactic analysis, semantic analysis, etc.). The natural language processor 314 may be configured to recognize and analyze any number of natural languages. In some embodiments, the natural language processor 314 may parse passages of the documents. Further, the natural language processor 314 may include various modules to perform analyses of electronic documents. These modules may include, but are not limited to, a tokenizer 316, a part-of-speech (POS) tagger 318, a semantic relationship identifier 320, and a syntactic relationship identifier 322.

In some embodiments, the tokenizer 316 may be a computer module that performs lexical analysis. The tokenizer 316 may convert a sequence of characters into a sequence of tokens. A token may be a string of characters included in an electronic document and categorized as a meaningful symbol. Further, in some embodiments, the tokenizer 316 may identify word boundaries in an electronic document and break any text passages within the document into their component text elements, such as words, multiword tokens, numbers, and punctuation marks. In some embodiments, the tokenizer 316 may receive a string of characters, identify the lexemes in the string, and categorize them into tokens.

Consistent with various embodiments, the POS tagger 318 may be a computer module that marks up a word in passages to correspond to a particular part of speech. The POS tagger 318 may read a passage or other text in natural language and assign a part of speech to each word or other token. The POS tagger 318 may determine the part of speech to which a word (or other text element) corresponds, based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one formula may shed light on the meaning of text elements in another formula). In embodiments, the output of the natural language processing system 312 may populate a text index, a triplestore, or a relational database to enhance the contextual interpretation of a word or term. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In some embodiments, the POS tagger 318 may tag or otherwise annotate tokens of a passage with part of speech categories. In some embodiments, the POS tagger 318 may tag tokens or words of a passage to be parsed by the natural language processing system 312.

In some embodiments, the semantic relationship identifier 320 may be a computer module that may be configured to identify semantic relationships of recognized text elements (e.g., words, phrases) in documents. In some embodiments, the semantic relationship identifier 320 may determine functional dependencies between entities and other semantic relationships.

Consistent with various embodiments, the syntactic relationship identifier 322 may be a computer module that may be configured to identify syntactic relationships in a passage composed of tokens. The syntactic relationship identifier 322 may determine the grammatical structure of sentences such as, for example, which groups of words are associated as phrases and which word is the subject or object of a verb. The syntactic relationship identifier 322 may conform to formal grammar.

In some embodiments, the natural language processor 314 may be a computer module that may parse a document and generate corresponding data structures for one or more portions of the document. For example, in response to receiving an unstructured textual report at the natural language processing system 312, the natural language processor 314 may output parsed text elements from the report as data structures. In some embodiments, a parsed text element may be represented in the form of a parse tree or other graph structure. To generate the parsed text element, the natural language processor 314 may trigger computer modules 316-322.

In some embodiments, the output of natural language processor 314 may be used by search application 328 to perform a search of a set of (e.g., one or more) corpora to retrieve information regarding content artifacts and/or media. As used herein, a corpus may refer to one or more data sources. In some embodiments, the data sources 324 may include data warehouses, information corpora, data models, and document repositories. In some embodiments, the data sources 324 may include an information corpus 326. The information corpus 326 may enable data storage and retrieval. In some embodiments, the information corpus 326 may be a storage mechanism that houses a standardized, consistent, clean, and integrated list of conversation topics and/or emotional sentiments. The information corpus 326 may also store, for each topic/sentiment, a list of associated outcomes, by visitor. For example, the information corpus 326 may include a ranking of conversational topics for each encountered visitor, and/or a visitor profile for each encountered visitor. The data may be sourced from various operational systems. Data stored in the information corpus 326 may be structured in a way to specifically address reporting and analytic requirements. In some embodiments, the information corpus 326 may be a data repository, a relational database, triplestore, or text index.

In some embodiments, the content artifact analyzer 330 may be a computer module that identifies conversational topics and visitor sentiments associated with those topics. In some embodiments, the content artifact analyzer 330 may include a topic identifier 332 and a sentiment analyzer 334. When an unstructured textual document is received by the natural language processing system 312, the content artifact analyzer 330 may be configured to analyze the document using natural language processing to identify one or more content topics. The content artifact analyzer 330 may first parse the conversation using the natural language processor 314 and related subcomponents 316-322. After parsing the conversation, the topic identifier 332 may identify one or more topics present in the content artifact. This may be done, for example, by searching a dictionary (e.g., information corpus 326) using the search application 328.

The sentiment analyzer 334 may determine the content sentiment for the content artifact, according to the content topic identified by topic identifier 332. This may be done by using the search application 328 to traverse the various data sources (e.g., the information corpus 326) for information regarding the terms and phrases used within the content artifact. The sentiment analyzer 334 may search, using natural language processing, documents from the various data sources for terms related to those detected in the content artifact.

Figure 4:
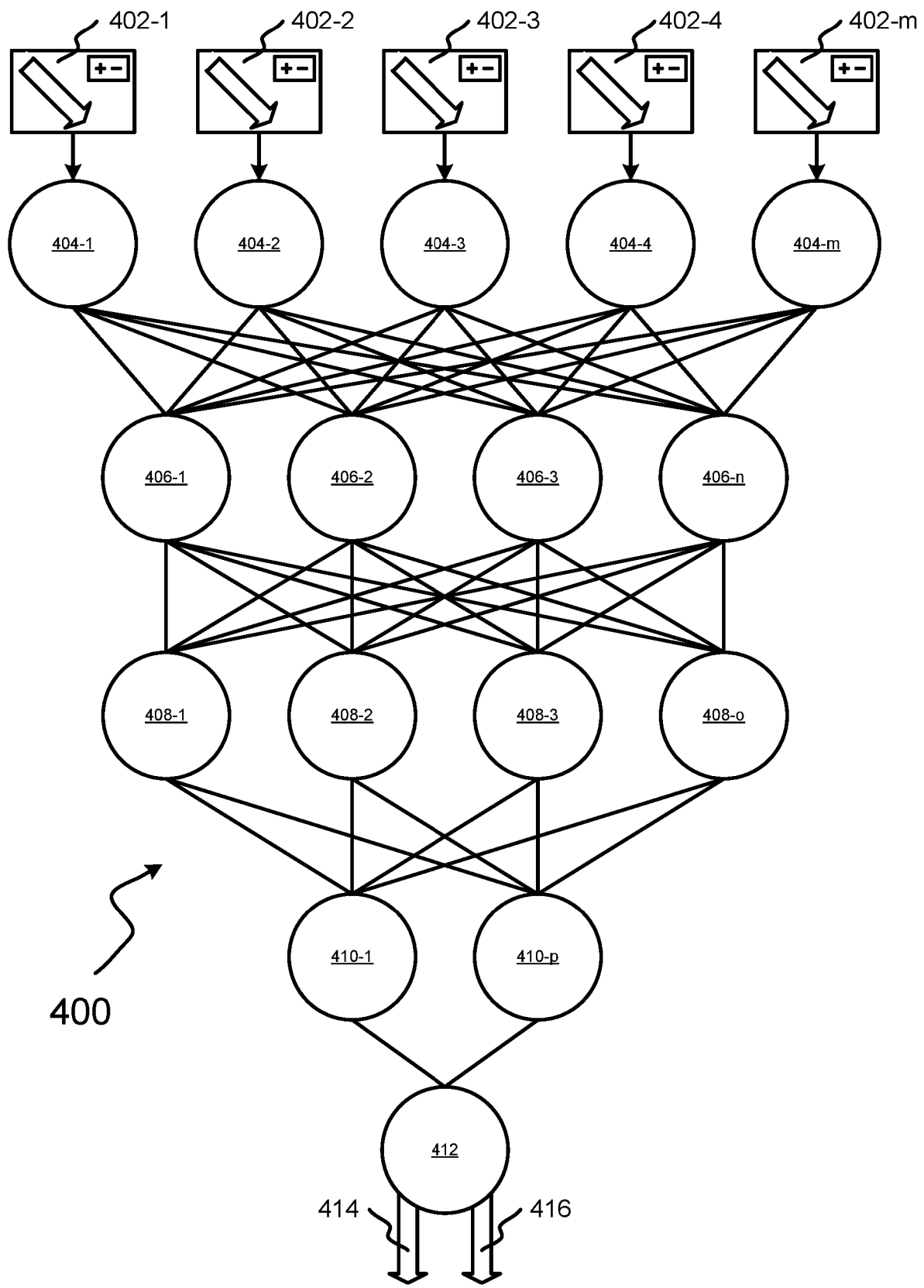
FIG. 4 illustrates an example neural network that may be specialized to process a set of inputs to arrive at a content or medium sentiment score, in accordance with embodiments of the present disclosure.

FIG. 4 depicts an example neural network 400 that may be specialized to process a set of inputs to arrive at a cognitively generated sentiment score and/or a cognitively generated similarity score, in accordance with embodiments of the present disclosure. Inputs may include, for example, data retrieved/received from a content artifact processing system, such as content artifact processing system 214 of FIG. 2, or a media processing system, such as media processing system 206 of FIG. 2. In embodiments, neural network 400 may be a classifier-type neural network. Neural network 400 may be part of a larger neural network. For example, neural network 400 may be nested within a single, larger neural network, connected to several other neural networks, or connected to several other neural networks as part of an overall aggregate neural network.

Inputs 402-1 through 402-$m$ represent the inputs to neural network 400. In this embodiment, 402-1 through 402-$m$ do not represent different inputs. Rather, 402-1 through 402-$m$ represent the same input that is sent to each first-layer neuron (neurons 404-1 through 404-$m$) in neural network 400. In some embodiments, the number of inputs 402-1 through 402-$m$ (i.e., the number represented by m) may equal (and thus be determined by) the number of first-layer neurons in the network. In other embodiments, neural network 400 may incorporate 1 or more bias neurons in the first layer, in which case the number of inputs 402-1 through 402-$m$ may equal the number of first-layer neurons in the network minus the number of first-layer bias neurons. In some embodiments, a single input (e.g., input 402-1) may be input into the neural network. In such an embodiment, the first layer of the neural network may comprise a single neuron, which may propagate the input to the second layer of neurons.

Inputs 402-1 through 402-$m$ may comprise one or more artifact component(s) and a relative composition that is associated with a compositional artifact. For example, inputs 402-1 through 402-$m$ may comprise 10 components with their relative compositions that are associated with a seed artifact. In other embodiments, not all components and their relative compositions may be input into neural network 400. For example, in some embodiments, 30 components may be input into neural network 400, but relative compositions for only 20 components may be input into neural network 400.

Neural network 400 may comprise 5 layers of neurons (referred to as layers 404, 406, 408, 410, and 412, respectively corresponding to illustrated nodes 404-1 to 404-$m$, nodes 406-1 to 406-$n$, nodes 408-1 to 408-$o$, nodes 410-1 to 410-$p$, and node 412). In some embodiments, neural network 400 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 412 is treated as the output layer. Layer 412 outputs a probability that a target event will occur, and contains only one neuron (neuron 412). In other embodiments, layer 412 may contain more than 1 neuron. In this illustration no bias neurons are shown in neural network 400. However, in some embodiments each layer in neural network 400 may contain one or more bias neurons.

Layers 404-412 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the ReLU function. For example, layer 404 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 406, for example, may be a dense layer. In this example, the dense layer may process and reduce the dimensions of the feature vector (e.g., the vector portion of inputs 402-1 through 402-$m$) to eliminate data that is not contributing to the prediction. As a further example, layer 408 may be a "batch normalization" layer. Batch normalization may be used to normalize the outputs of the batch-normalization layer to accelerate learning in the neural network. Layer 410 may be any of a dropout, hidden, or batch-normalization layer. Note that these layers are examples. In other embodiments, any of layers 404 through 410 may be any of dropout, hidden, or batch-normalization layers. This is also true in embodiments with more layers than are illustrated here, or fewer layers.

Layer 412 is the output layer. In this embodiment, neuron 412 produces outputs 414 and 416. Outputs 414 and 416 represent complementary probabilities that a target event will or will not occur. For example, output 414 may represent the probability that a target event will occur, and output 416 may represent the probability that a target event will not occur. In some embodiments, outputs 414 and 416 may each be between 0.0 and 1.0, and may add up to 1.0. In such embodiments, a probability of 1.0 may represent a projected absolute certainty (e.g., if output 414 were 1.0, the projected chance that the target event would occur would be 100%, whereas if output 416 were 1.0, the projected chance that the target event would not occur would be 100%).

In embodiments, FIG. 4 illustrates an example probability-generator neural network with one pattern-recognizer pathway (e.g., a pathway of neurons that processes one set of inputs and analyzes those inputs based on recognized patterns, and produces one set of outputs. However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well (e.g., several smaller vectors may merge to create one vector). This merger may increase the ability to identify correlations in the patterns identified among different inputs, as well as eliminate data that does not appear to be relevant.

In embodiments, neural network 400 may be trained/adjusted (e.g., biases and weights among nodes may be calibrated) by inputting feedback and/or input from a user, as described herein (e.g., see description of FIG. 1B) to correct/force the neural network to arrive at an expected output. In embodiments, the impact of the feedback on the weights and biases may lessen over time, in order to correct for emotional fluctuations of the user(s). In embodiments, the degradation of the impact may be implemented using a half-life (e.g., the impact degrades by 50% for every time interval of X that has passed) or similar model (e.g., a quarter-life, three-quarter-life, etc.).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
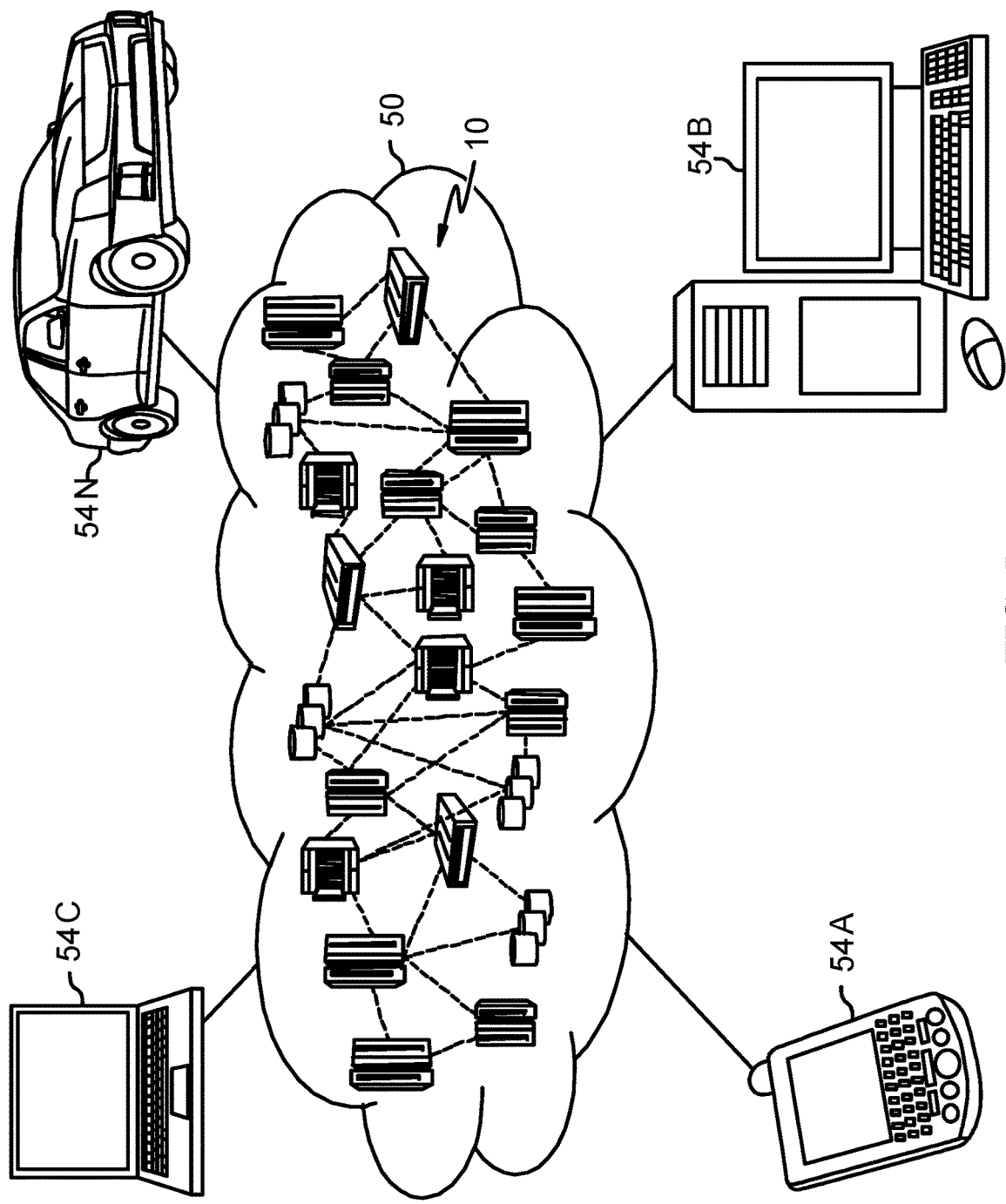
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
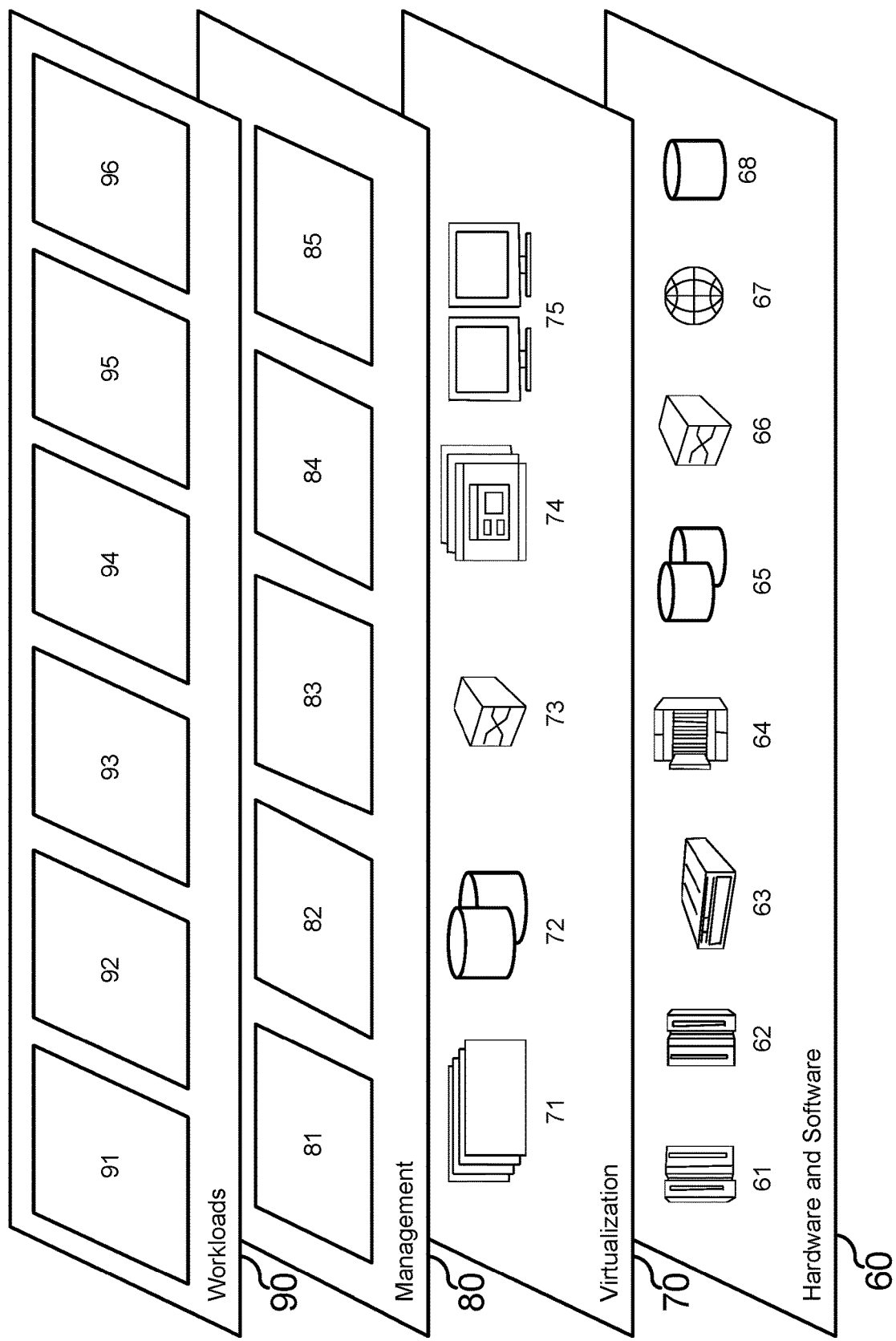
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media selection based on content topic and sentiment 96.

Figure 7:
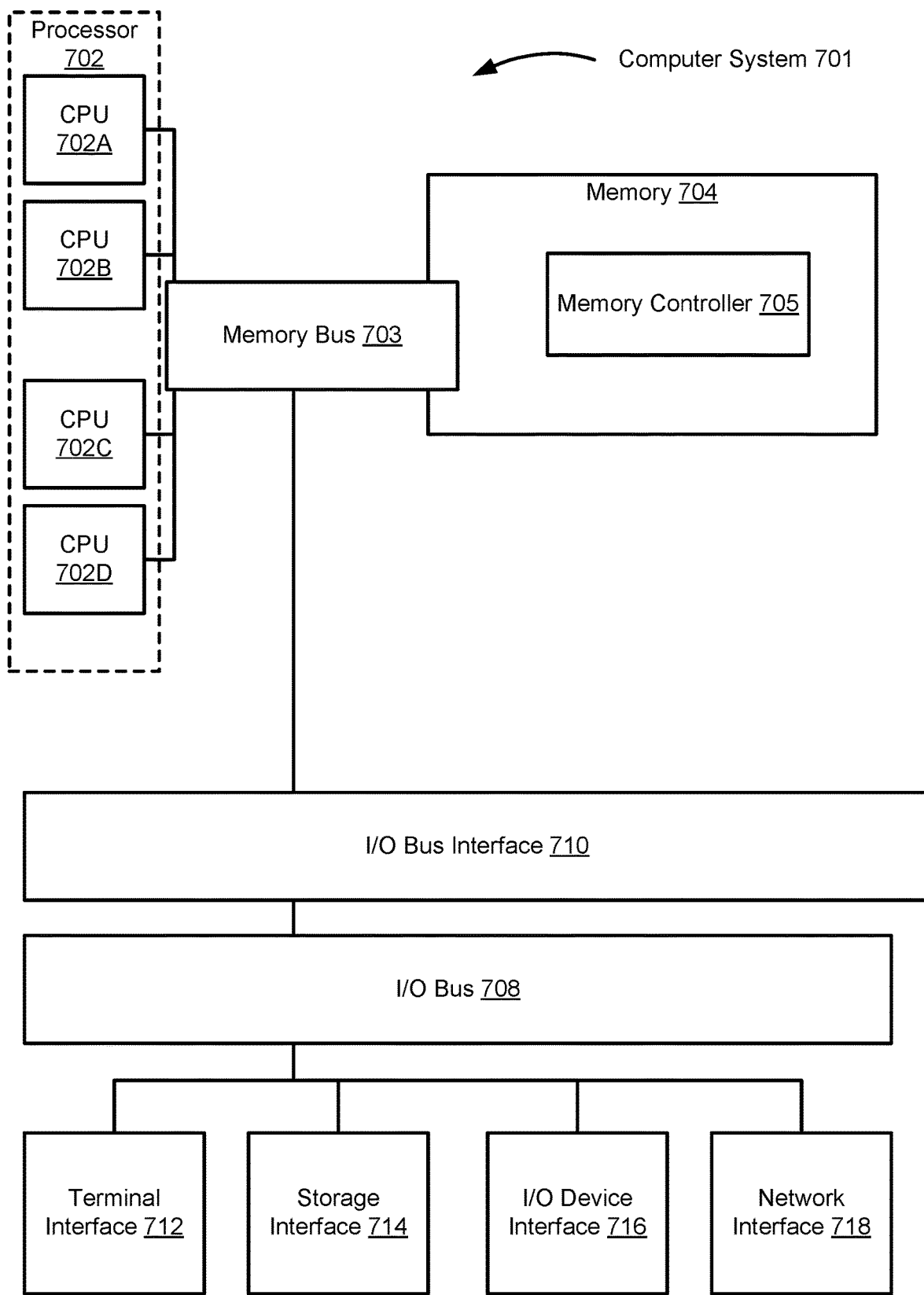
FIG. 7 illustrates a high-level block diagram of an example computer system that may be used in implementing embodiments of the present disclosure.

Referring now to FIG. 7, shown is a high-level block diagram of an example computer system 701 that may be configured to perform various aspects of the present disclosure, including, for example, methods 100A/B, described in FIGS. 1A/B, respectively. The example computer system 701 may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for media selection according to the topic and sentiment of content, comprising:
   receiving, from a remote system and over a network, a content artifact;
   selecting a processing module to analyze the content artifact based on a digital file format of the content artifact;
   converting, by performing analysis using the selected processing module, the digital file format of the content artifact into a textual format;
   performing, using a natural language processor and a relational database that relates phrases with topics, natural language processing on the content artifact to determine a content topic of the content artifact;
   generating, using a neural network, a content sentiment score associated with the content topic, wherein the neural network receives data from the relational database as input and has at least one layer comprising at least one activation function configured to transform the content topic into the content sentiment score;
   retrieving, from a content database, a set of media stored in the content database, the set of media being selected based on the content topic;
   generating, for each medium within the set of media, a medium sentiment score associated with the content topic;
   tagging, using one or more metadata tags, each medium with the generated medium sentiment score for that respective medium;
   comparing the content sentiment score with the set of media sentiment scores to obtain a set of similarity scores; and
   based on the similarity scores, displaying, to a user, one or more media of the set of media.

2. The method of claim 1, further comprising:
   receiving, from the user, a medium selection from the one or more media; and
   displaying, to a second user, the selected medium.

3. The method of claim 2, wherein each medium of the set of media includes one or more metadata tags associated with one or more media topics associated with the respective medium.

4. The method of claim 3, further comprising:
   searching the content database for media with a metadata tag matching the content topic.

5. The method of claim 2, further comprising:
   in response to receiving the medium selection, adjusting the medium sentiment score for the selected medium so that the similarity score for the selected medium becomes the greatest similarity score of the set of similarity scores.

6. The method of claim 5, wherein generating medium sentiment scores includes generating the medium sentiment scores using sentiment analysis.

7. The method of claim 6, wherein generating medium sentiment scores is performed using a neural network.

8. The method of claim 7, wherein adjusting the medium sentiment score includes adjusting a weight and a bias of one or more neural network edges.

9. The method of claim 1, wherein the content artifact includes an audio feed, a document, one or more text messages, one or more instant messages, a video feed, or streaming content.

10. The method of claim 1, wherein the set of media includes images, videos, audio clips, emojis, and music.

11. The method of claim 1, wherein the set of media is retrieved in real time.

12. The method of claim 1, wherein the method enables unilaterally provisioning computing capabilities in a cloud environment.

13. The method of claim 1, wherein the content artifact is received in real time.

14. The method of claim 1, wherein the set of media is selected in real time.

15. A system for media selection according to the topic and sentiment of content, comprising:
   a memory with program instructions included thereon; and
   a processor in communication with the memory, wherein the program instructions cause the processor to:
      receive a content artifact;
      identify, based on the content artifact, a content topic;
      generate, based on the content artifact, a content sentiment score associated with the content topic, the content sentiment score generated using a neural network which has at least one layer comprising at least one activation function configured to transform the content topic into the content sentiment score;
      identify, based on the content topic, a set of media stored in a content database;
      retrieve, from the content database, the set of media;
      generate, for each medium within the set of media, a medium sentiment score associated with the content topic;
      compare the content sentiment score with the set of media sentiment scores to obtain a set of similarity scores; and
   based on the similarity scores, display, to a user, one or more media of the set of media, wherein:
   identifying the content topic includes analyzing the content artifact using a natural language processor, the natural language processor including:
      a tokenizer configured to convert a sequence of characters into a sequence of tokens by identifying word boundaries within the content artifact;
      a part-of-speech tagger configured to determine a part of speech for each token using natural language processing and mark each token with its part of speech;
      a semantic relationship identifier configured to identify semantic relationships of recognized text elements in the content artifact; and
      a syntactic relationship identifier configured to identify syntactic relationships amongst tokens.

16. The system of claim 15, wherein the program instructions further cause the processor to:
   receive, from the user, a medium selection from the one or more media; and
   display, to a second user, the selected medium.

17. The system of claim 16, wherein the program instructions further cause the processor to:
   in response to receiving the medium selection, adjust the medium sentiment score for the selected medium to cause the similarity score for the selected medium to become the greatest similarity score of the set of similarity scores.

18. The system of claim 15, wherein each medium of the set of media includes one or more metadata tags associated with one or more media topics associated with the respective medium.

19. A computer program product for media selection according to the topic and sentiment of content, the computer program product comprising a computer readable storage medium having program instructions embodied therewith, the program instructions executable by a device to cause the device to:
   receive, from a remote system and over a network, a content artifact;
   select a processing module to analyze the content artifact based on a digital file format of the content artifact;
   convert, by performing analysis using the selected processing module, the digital file format of the content artifact into a textual format;
   perform, using a natural language processor and a relational database that relates phrases with topics, natural language processing on the content artifact to determine a content topic of the content artifact;
   generate, using a neural network, a content sentiment score associated with the content topic, wherein the neural network receives data from the relational database as input and has at least one layer comprising at least one activation function configured to transform the content topic into the content sentiment score;
   retrieve, from a content database, a set of media stored in the content database, the set of media being selected based on the content topic;
   generate, for each medium within the set of media, a medium sentiment score associated with the content topic;
   tag, using one or more metadata tags, each medium with the generated medium sentiment score for that respective medium;
   compare the content sentiment score with the set of media sentiment scores to obtain a set of similarity scores;
   based on the similarity scores, display, to a user, one or more media of the set of media;
   receive, from the user, a selection of media of the displayed media;
   compare the content sentiment score of the selected media with content sentiment scores of non-selected media; and
   adjust the generation of medium sentiment scores such that the medium sentiment score of the selected media has a highest similarity score.

20. The computer program product of claim 19, wherein the program instructions further cause the device to:
   receive, from the user, a medium selection from the one or more media; and
   display, to a second user, the selected medium.

* * * * *